UNITED STATES PATENT OFFICE.

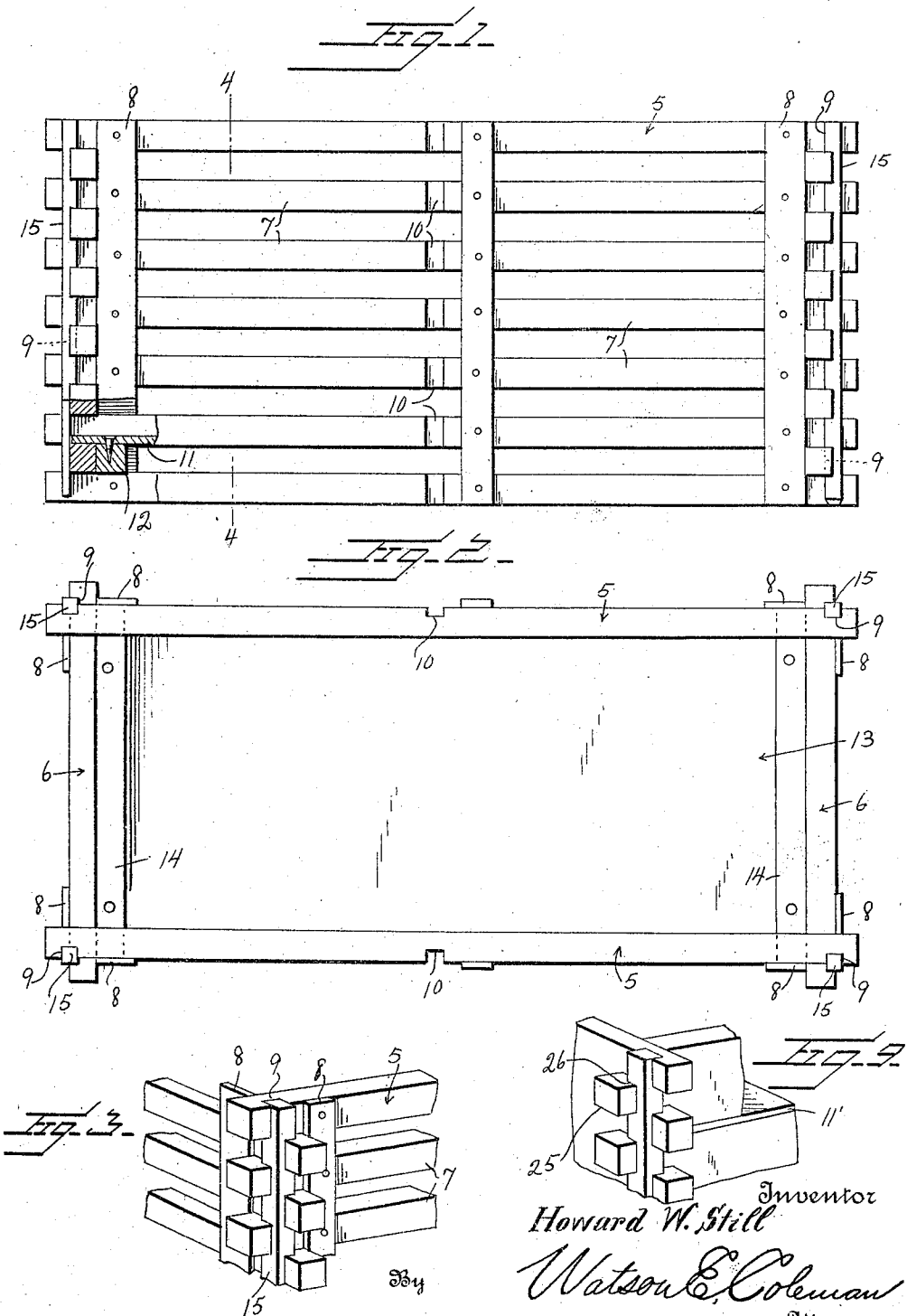

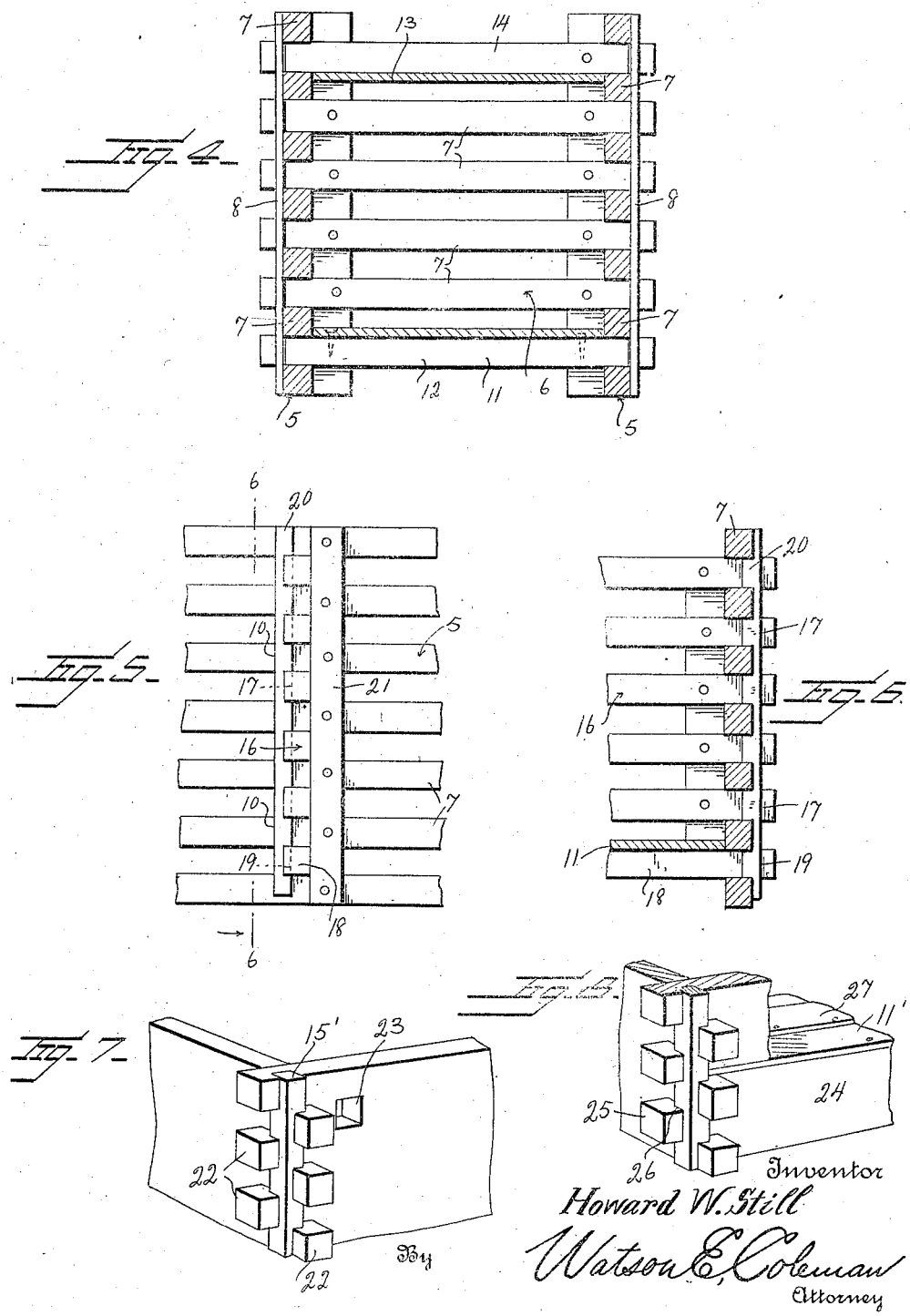

HOWARD W. STILL, OF FARGO, NORTH DAKOTA.

BOX.

1,300,671.  Specification of Letters Patent.  Patented Apr. 15, 1919.

Application filed August 24, 1918. Serial No. 251,245.

*To all whom it may concern:*

Be it known that I, HOWARD W. STILL, a citizen of the United States, residing at Fargo, North Dakota, have invented certain new and useful Improvements in Boxes, of which the following is a specification, reference being had to the accompanying drawings.

This invention relates to boxes, crates and the like, and has for its primary object to provide a box of the collapsible or knockdown type, the several parts of which may be easily and quickly assembled in their erect positions, or compactly arranged and bound together so that they will occupy comparatively little space in transportation.

It is another and more particular object of the invention to provide a knock-down box consisting of side and end sections, and detachable corner bars adapted for interlocking engagement with said side and end sections to retain the latter in their assembled positions.

It is another important object of the invention to provide a box or crate as above characterized which may be advantageously employed for the shipment of live stock, poultry, eggs and other commodities, of such construction that access may be easily had to the interior of the box or crate.

And it is a further general object of the invention to provide a knock-down or collapsible crate or box which is simple and inexpensive in its construction, exceedingly strong and durable and highly serviceable and convenient for the purpose in view.

With the above and other objects in view, the invention consists in the improved combination, construction and relative arrangement of the several parts as will be hereinafter more fully described, subsequently claimed and illustrated in the accompanying drawings in which similar reference characters designate corresponding parts throughout the several views, and wherein:

Figure 1 is a side elevation illustrating one embodiment of my improved knockdown crate;

Fig. 2 is a top plan view;

Fig. 3 is a fragmentary perspective view of one corner of the box or crate;

Fig. 4 is a vertical transverse section taken on the line 4—4 of Fig. 1;

Fig. 5 is a fragmentary side elevation illustrating the central partition in place when the crate is used for the shipment of eggs or similar commodities;

Fig. 6 is a section through one side of the crate taken on the line 6—6 of Fig. 5;

Fig. 7 is a fragmentary perspective view similar to Fig. 3 illustrating a modified construction of the device, and Figs. 8 and 9 are fragmentary detail perspective views illustrating slightly modified means for securing the bottom and top of the box in place.

Referring in detail to the drawings, 5 designates the two side sections of the box or crate and 6 the two end sections thereof. Each of these box sections is made up of a plurality of parallel slats or bars 7 which are rigidly connected to each other at their outer sides and adjacent their opposite ends by the bars 8. Between the connecting bars and the ends of the slats, each slat is provided in its outer side face with a transverse notch or recess 9. Each of the bars or slats 7 of the side sections of the crate is also provided substantially midway between its ends and in its outer side face with the additional transverse notch or recess 10. These notches 9 and 10 are of square or rectangular form and the purpose thereof will more fully appear in the following description.

The bottom 11 of the crate or box has rectangular bars or cleats 12 secured to its under side and in spaced relation to its opposite ends. These cleats project beyond the side edges of the bottom 11 and are adapted for engagement between the two lowermost bars of the side sections 5 of the crate. The ends of the bottom 11 extend over and upon the lower bars or slats 7 of the crate ends 6. The top 13 is of similar construction and has the cleats 14 secured to its upper side in spaced relation to its opposite ends, the extremities of said cleats being adapted for engagement between the two upper longitudinal bars of the side sections 5, while the ends of the top 13 extend over the top bars of the crate ends 6.

In assembling the parts of the box or crate as above described, the sides 5 are arranged in spaced relation to each other and the box bottom 11 then disposed between said sides as above stated. One end 6 of the crate is then arranged in place, the ends of the slats or bars 7 extending between the ends of the bars 7 of the sides 5 of the crate and beyond the same, said end sections being engaged against the connecting bars 8 on the crate sides, while the sides of the crate are likewise engaged against the bars 8 on the ends 6. The notches or recesses in the side and end bars of the crate will then be in vertical alinement with each other. Key bars 15 are then inserted downwardly through these alined notches or recesses, said bars having frictional interlocking engagement with the slats or bars 7 of the sides and ends of the crate. The top 13 of the crate is then moved longitudinally to its applied position between the sides of the crate and finally the other end 6 of the crate is assembled upon the opposite ends of the sides 5 and additional key bars 15 inserted. Of course, it is understood that the hog or other animal is first driven into the open end of the crate before the latter end section is applied and secured in place. If it is desired to fill the crate from the top, the top 13 without the cleats 14 is finally arranged in its position after the sides and ends have been assembled, and the cleats 14 then disposed between the top slats or bars of the sides 5, and the top 13 secured to said cleats by means of suitable screws. When the crate or box is used for the shipment of poultry, the top 13 may be provided with a suitable door. In the shipment of light materials, in order to secure greater space within the crate, the bottom 11 of the box or crate may be inverted so that said box bottom will be disposed in a horizontal plane coincident with the lower slats 7 of the crate sides.

In Figs. 5 and 6 of the drawings, I have shown a central dividing partition 16 arranged between the opposite sides of the crate, said partition likewise consisting of a plurality of parallel bars having their end portions projecting between the bars or slats 7 of the crate sides and provided with the notches 17 therein to register with the notches or recesses 10 in the sides of the crate. The lower bar of the partition 16 is disposed above the bottom 11 and an additional bar 18 is inserted transversely beneath the box or crate bottom and projects beyond the two lowermost bars or slats 7 of the crate sides. This bar 18 is likewise provided with the rectangular notches or recesses 19. Keys 20 are then inserted downwardly through the notches 10 and 17 and the notches 19. The ends of the partition 16 and of the bar 18 engage a stop, cleat or bar 21 secured to the outer side of each side section 5 of the crate whereby lateral shifting movement of said partition and the bar 18 with respect to the bars 20 is prevented.

In Fig. 7 I have shown the sides and ends of the crate of solid construction and provided with the interlocking tenons 22 which are notched or recessed as above explained to receive the key bars 15'. In this construction of the crate or box, the side walls or sections will be provided with rectangular openings, indicated at 23, to receive the cleats 12 and 14 on the bottom and top sections of the crate.

In Fig. 8 of the drawings I have illustrated a slightly modified means for securing the box bottom in place, which is applicable either to the solid box construction or to the slatted crate. As therein shown, the bottom wall 11' is fixed at each of its ends to the upper edge of a bar 24. This bar is formed at each end with longitudinally projecting tenons 25, in the outer side face of which a vertically disposed groove or channel 26 is cut. The distance from the upper longitudinal edge of the tenon to the upper surface of the bottom wall 11' is the same as the distance from the lower edge of the tenon to the lower edge of the bar 24 so that the bottom wall may be inserted either with the bar 24 extending downwardly or upwardly therefrom. To the upper surface of the wall 11', in spaced relation to each of its end edges and in parallel relation thereto, a cleat 27 is fixed. In the use of this modified construction, the end walls of the box structure are shorter than the side walls thereof, the upper and lower edges of said end walls being spaced from the corresponding edges of the side walls. In assembling the box bottom 11', it is arranged between the lower edges of the side walls and the tenons 25 on the bars 24 are engaged in the lowermost mortises on the ends of the side walls of the box, the channels 26 in the tenons 25 registering with one end of the grooves or recesses in the tenons on the box wall. The end walls are then arranged in place upon the ends of the bottom 11' and the key bars 15 are then inserted through the registering grooves of the tenons on the end and side walls and the grooves 26 on the tenons 25, thus securely locking all of the parts together. The plate 27 on the ends of the bottom wall 11' being engaged against the inner faces of the end walls effectually prevents horizontal shifting of the box bottom.

The modified top construction for the box is substantially the same as the bottom construction, with the exception, as shown in Fig. 9, that the top wall 13' of the box is not secured to the end bars 24. This top 13' is first arranged in place between the assembled side and end walls and the key bars 15 at the corners of the box are then pushed downwardly below the uppermost mortises in the ends of the side walls. The bars 24 are then arranged upon the ends of the top 13' and the tenons 25 engaged in said mortises, after which the keys 15 are again pushed upwardly so that they will engage in the grooves 26 of said tenons. The top 13' is also provided with suitable cleats similar to the cleats 27, as shown in Fig. 8, which will engage against the inner side faces of the bars 24 and prevent shifting movement of the box top. However, if preferred, the bars 24 may first be arranged in place and the top 13' then secured to the upper edges of said bars by means of suitable screws. In the use of this removable top in the crate construction, the top is thus secured to the bars 24, since if the top were separate and placed within the crate and secured by means of the bars 24, as above explained, too much space would be taken up.

From the foregoing description, taken in connection with the accompanying drawings, the construction and several advantages of my invention will be clearly and fully understood. The crate or box may be easily and quickly knocked down or disassembled by simply withdrawing the key bars 15. The sides and ends of the crate, together with the top and bottom sections, can then be compactly arranged in superposed relation and suitably tied or bound together. When so arranged, it is apparent that a very large number of the boxes or crates can be packed or stored within a car for return shipment. The parts of the box or crate structure can also be assembled when the box is to be packed or filled in a very expeditious manner. The assembled box or crate sections provide a very strong and substantial structure which will withstand all ordinary shocks and jars to which the crates might be subjected. When it is desired to remove a portion of the contents of the crate, the keys 15 at opposite corners of the box can be withdrawn and one end section 6 of the box removed so as to afford access to the interior thereof. The end section can subsequently be easily and quickly replaced and secured in assembled position.

The several parts of my improved knockdown box or crate either in the slat construction or in the solid form of the side and end sections is quite simple and inexpensive so that the improved box or crate as a whole can be manufactured at relatively small cost. It will be apparent, of course, that the crate may be produced in various sizes and also of other dimensions than as illustrated in the accompanying drawings. The device is likewise susceptible of many other modifications in the form, proportion and arrangement of the several parts and it is, therefore, to be understood that I reserve the privilege of adopting all such legitimate changes as may be fairly embodied within the spirit and scope of the invention as claimed.

I claim:

1. A collapsible box or crate comprising side and end sections having portions to intersect each other at the corners of the box when said sections are assembled, said portions being provided with rectangular notches, a top and a bottom wall, bars to retain said top and bottom walls in place having tenons at their ends provided with grooves to register with certain of said notches, and removable key bars adapted to be vertically engaged through the notches in the ends and sides of the box and through said grooves to retain the several parts in their assembled positions.

2. A collapsible box or crate comprising side and end sections, each having spaced portions at its opposite ends, said portions intersecting each other at the corners of the box when the sections are assembled, said intersecting portions being provided with rectangular notches, a bottom for the box, bars secured to the ends of said bottom and having longitudinally extending tenons adapted for engagement between the lower spaced portions of the side sections of the box, said tenons having grooves to register with grooves in said spaced portions of the box sections, removable keys adapted to engage through said notches and the grooves in said tenons to retain the several box sections in their assembled positions, and cleats fixed to the box bottom to coact with the end sections and prevent shifting movement of said box bottom.

In testimony whereof I hereunto affix my signature in the presence of two witnesses.

HOWARD W. STILL.

Witnesses:
 JACOB H. GOLDBERG,
 ALFRED FROLUND.

Copies of this patent may be obtained for five cents each, by addressing the "Commissioner of Patents, Washington, D. C."